(12) United States Patent
Hsu

(10) Patent No.: US 10,732,138 B2
(45) Date of Patent: Aug. 4, 2020

(54) BIOSENSOR STRIP

(71) Applicant: BIONIME CORPORATION, Taichung (TW)

(72) Inventor: Cheng-Teng Hsu, Taichung (TW)

(73) Assignee: BIONIME CORPORATION, Taichung (TW)

( * ) Notice: Subject to any disclaimer, the term of this patent is extended or adjusted under 35 U.S.C. 154(b) by 43 days.

(21) Appl. No.: 14/573,229

(22) Filed: Dec. 17, 2014

(65) Prior Publication Data

US 2015/0168334 A1    Jun. 18, 2015

(30) Foreign Application Priority Data

Dec. 17, 2013  (TW) .............................. 102146597 A

(51) Int. Cl.
*G01N 27/327*  (2006.01)

(52) U.S. Cl.
CPC ................. *G01N 27/3272* (2013.01)

(58) Field of Classification Search
CPC .................. G01N 27/307; G01N 27/3272
See application file for complete search history.

(56) References Cited

U.S. PATENT DOCUMENTS

| 3,919,627 A | * | 11/1975 | Allen | ..................... | G01R 27/22 |
| | | | | | 324/442 |
| 2004/0256228 A1 | * | 12/2004 | Huang | ............... | G01N 27/3272 |
| | | | | | 204/434 |
| 2009/0310743 A1 | * | 12/2009 | Carpenter | .............. | C12Q 1/004 |
| | | | | | 378/45 |

* cited by examiner

*Primary Examiner* — Louis J Rufo
(74) *Attorney, Agent, or Firm* — Volpe and Koenig, P.C.

(57) ABSTRACT

A biosensor strip includes a strip body, a working electrode and a chemical reagent layer, wherein the strip body has a conductive portion and a reaction channel. The partial wall that forms the reaction channel is a partial or an entire surface layer of the conductive portion. The reaction channel has an opening that receives the sample fluid and an electrode hole. The working electrode is embedded in the electrode hole. The chemical reagent is configured in the reaction channel and generates an electrochemical reaction with the analyte. Therefore, after the sample fluid covers the reaction channel and the working electrode via the opening, the conductive portion and the working electrode on the wall of the reaction channel generate sensing currents and output the signals via the first and second signal output sides to determine an analyte concentration in the sample fluid.

19 Claims, 8 Drawing Sheets

BIOSENSOR STRIP

CROSS REFERENCE TO RELATED APPLICATION

The present invention claims the benefits of Taiwan Patent Application No. 102146597, filed on Dec. 17, 2013, at the Taiwan Intellectual Property Office, the disclosures of which are incorporated herein in their entirety by reference.

FIELD OF THE INVENTION

The present invention relates to a sensor strip. In particular, it relates to a biosensor strip.

BACKGROUND OF THE INVENTION

Please refer to FIG. 1 and FIG. 2, which show an electrochemical sensor strip 10 disclosed in patent application TW 1294964. The electrochemical sensor strip 10 has an insulation substrate 12 having a reaction recess 11, an electrochemical reactive layer 13 in the reaction recess 11, a cover portion 14, an opening 15, two through holes 16 formed at the bottom of the reaction recess 11 and two electrodes 17 respectively placed in the through holes 16 and contact with the electrochemical reactive layer 13. The two electrodes 17 are a counter electrode and a working electrode.

The electrochemical sensor strip 10 is used to detect an analyte in a sample fluid 18. There is an electrochemical reaction performed between the analyte and the electrochemical reactive layer 13, and a signal current is generated for the electrodes 17 to detect after the sample fluid 18 enters and fully fills the reaction recess 11 via the opening 15.

The size of the reaction recess 11 is about 6 mm length, about 1.2 mm width and about 0.8 mm height. The volume is therefore approximately 0.6 mm$^3$. At least approximately 0.6 µL, of the sample fluid 18 is required to fully fill the reaction channel.

Although the complete electrochemical reactive layer 13 without being eroded by an erosion process can be used in the electrochemical sensor strip 10 to improve the accuracy of the electrochemical reaction, it still requires the configuration of two electrodes 17 which raises the usage of noble metals (such as a gold, a platinum, a palladium, or a rhodium), and therefore there is a failure to reduce the cost. Further, the reaction recess 11 must have a certain area to configure the two through holes 16 at the bottom. Accordingly, it is still difficult to reduce the volume of the sample fluid 18 to fully fill the bottom area of the reaction recess 11, which does not meet the goal of reducing the required sample fluid 18.

Please refer to FIG. 3, which is an electrochemical sensor strip 90 disclosed in patent application TW 1254795 (or U.S. Pat. No. 7,740,746). The electrochemical sensor strip 90 has a lower insulation piece 91, a fluid measurement recess 92 formed on the lower insulation piece 91, a through hole 93 connected to the fluid measurement recess 92, a first electrode 94 placed in the through hole 93, a conductive track 95 coupled to the first electrode 94, a upper insulation piece 96, a second conductive track 97 and a third conductive track 98 respectively printed on the upper insulation piece 96. Although the design of the upside and downside configuration of the electrodes can reduce the difficulty of printing, there are still the steps of multi-printing the conductive track in the strip manufacturing process. There is still room to raise the process efficiency. Accordingly, a strip which can eliminate printing the conductive track and reduce the required volume of the sample fluid at the same time is a worthwhile goal that deserves further research in this field.

In order to overcome the drawbacks in the prior art, a biosensor strip is disclosed. The particular design in the present invention not only solves the problems described above, but is also easy to implement. Thus, the present invention has utility for the industry.

SUMMARY OF THE INVENTION

Accordingly, it is an objective of the invention to provide a biosensor strip which reduces cost and the amount of the required sample fluid.

Accordingly, the biosensor strip of the invention is applicable for detecting an analyte in a sample fluid and includes a strip body, a working electrode and a chemical reagent layer. The strip body includes a substrate, a cover plate assembled on the substrate, a conductive portion integrally formed on at least any one of the substrate and the cover plate and a reaction channel defined by the relationship between the substrate and the cover plate. The partial wall that forms the reaction channel is a partial or an entire surface layer corresponding to the conductive portion. The conductive portion has an electro-reaction side on the surface and a first signal output side opposite to the electro-reaction side. The reaction channel has an opening which can receive the sample fluid, and an electrode hole. The working electrode is embedded in the electrode hole and has an electrode action side corresponding to the reaction channel and a second signal output side opposite to the electrode action side. The chemical reagent layer is configured in the reaction channel and applicable for generating an electrochemical reaction with the analyte. Therefore, after the sample fluid covers the reaction channel and the working electrode via the opening, the conductive portion and the working electrode at the wall of the reaction channel can generate sensing currents and output the signals via the first and second signal output sides to determine analyze concentration in the sample fluid.

The effect of the invention is: the partial wall that forms the reaction channel is a partial portion or an entire portion of the conductive portion and thereby there is only one working electrode required to be configured to use the working electrode and the conduction portion to detect respectively. In comparison with the prior art structure requiring two electrodes configured or the conductive track design which requires using the traditional printing process, the invention not only has the effects of reducing the usage of noble metals, applying no print process and reducing the cost, but achieves a reduction in the required volume for the sample fluid to fully fill the bottom area of the reaction channel which meets the requirement of small amount of the sample fluid by configuring only one electrode to reduce the bottom area of the reaction channel. Therefore a user does not have to penetrate deeply to acquire more fluid during a skin penetration fingerprick, which substantially reduces the pain of the fingerprick and avoids the risk of infection caused by a deep wound.

In accordance with an aspect of the present invention, a biosensor strip is disclosed. The biosensor strip, which is applicable to detect an analyte in a sample fluid, includes: a strip body comprising a substrate, a cover plate assembled on the substrate, a conductive portion integrally formed on at least any one of the substrate and the cover plate and a reaction channel defined by the relationship between the substrate and the cover plate, wherein a partial wall that forms the reaction channel is a partial or an entire surface layer corresponding to the conductive portion, the conductive portion has an electro-reaction side at the surface and a first signal output side opposite to the electro-reaction side, and the reaction channel has an opening which can receive the sample fluid, and an electrode hole; a working electrode, embedded in the electrode hole, having an electrode action side corresponding to the reaction channel and a second signal output side opposite to the electrode action side; and a chemical reagent layer, which at least covers the working electrode in the reaction channel, applicable for generating an electrochemical reaction with the analyte, wherein after the sample fluid covers the reaction channel and the working electrode via the opening, the conductive portion and the working electrode at a wall of the reaction channel can generate sensing currents and output signals via the first and second signal output sides to determine analyze concentration in the sample fluid.

In accordance with another aspect of the present invention, a biosensor strip is disclosed. A biosensor strip for detecting an analyte in a sample fluid, includes: a conductive strip body including a hole and a reaction channel; a hollow insulating piece received in the hole; a working electrode disposed in the hollow insulating piece; a chemical reagent layer disposed on the working electrode, and generating an electrochemical reaction with the analyte through a cooperation of the working electrode and the conductive strip body when the sample fluid is filled in the reaction channel; and a cover plate covering the hole and the reaction channel.

In accordance with the other aspect of the present invention, a biosensor strip is disclosed. A biosensor strip for detecting an analyte in a sample fluid, includes: a strip body including a hole and a reaction channel; a hollow insulating piece received in the hole; a working electrode disposed in the hollow insulating piece; a conductive cover plate covering the hole and the reaction channel; and a chemical reagent layer disposed on the working electrode, and generating an electrochemical reaction with the analyte through a cooperation of the working electrode and the conductive cover plate when the sample fluid is filled in the reaction channel.

BRIEF DESCRIPTION OF THE DRAWINGS

A more complete understanding of the invention and many of the attendant advantages thereof may be readily obtained by reference to the following detailed description when considered in connection with the accompanying drawings, wherein.

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Before the invention is described in detail, it should be noted that in the following descriptions, similar elements are noted with the same numbers.

Figure 1:
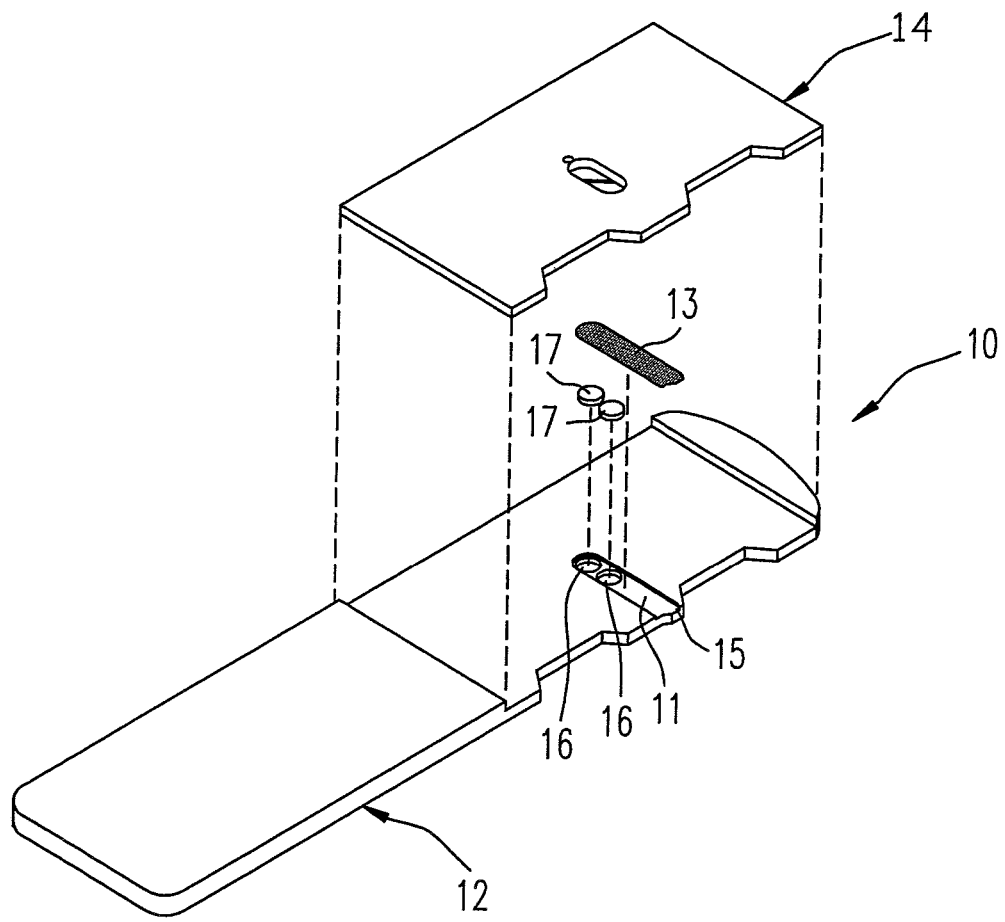
FIG. 1 is a partial pictorial breakdown drawing of an electrochemical sensor strip.
Figure 2:
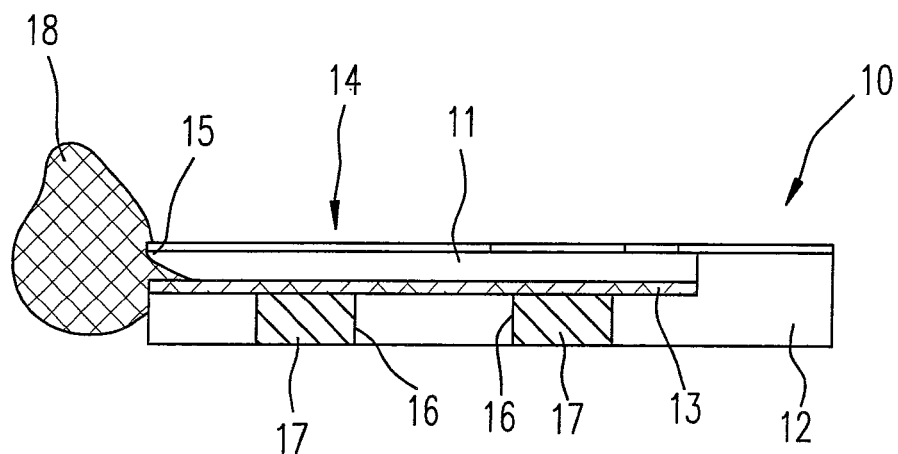
FIG. 2 is an employing schematic diagram showing the electrochemical sensor strip during detecting.
Figure 3:
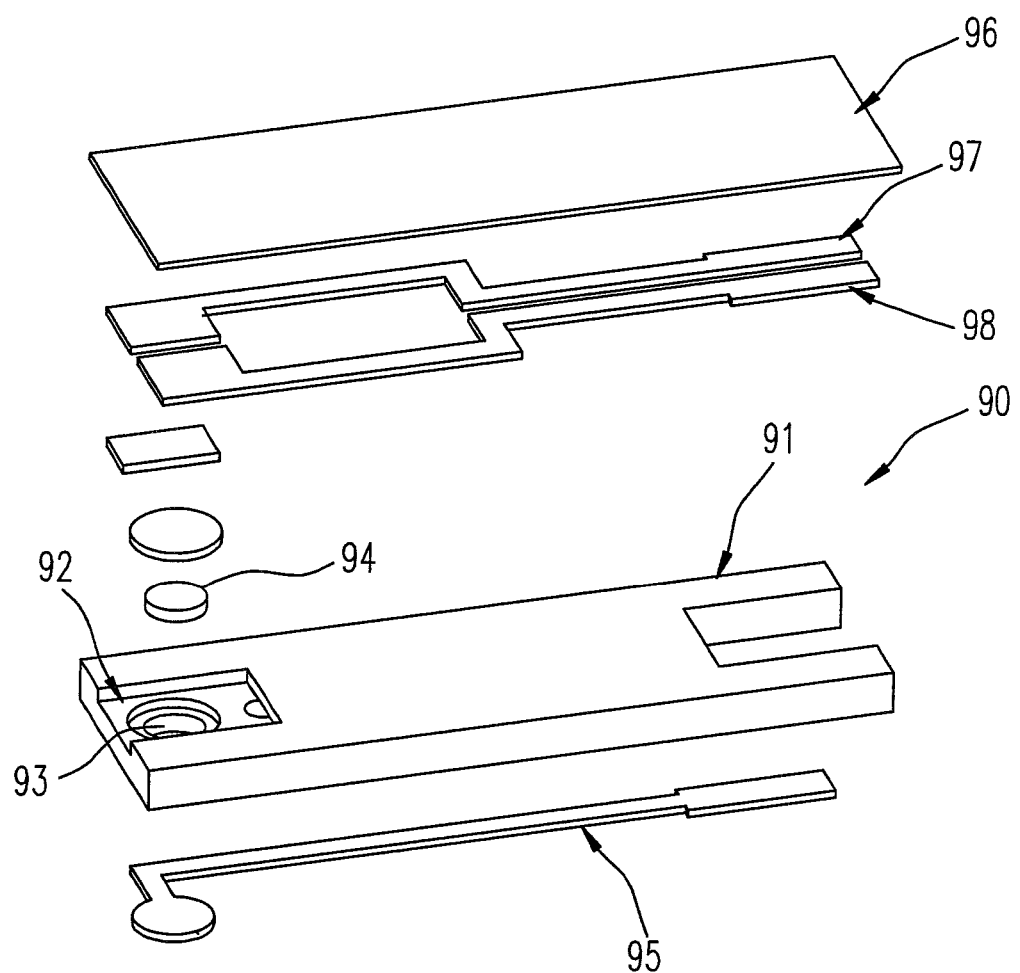
FIG. 3 is a partial pictorial breakdown drawing of another electrochemical sensor strip.
Figure 4:
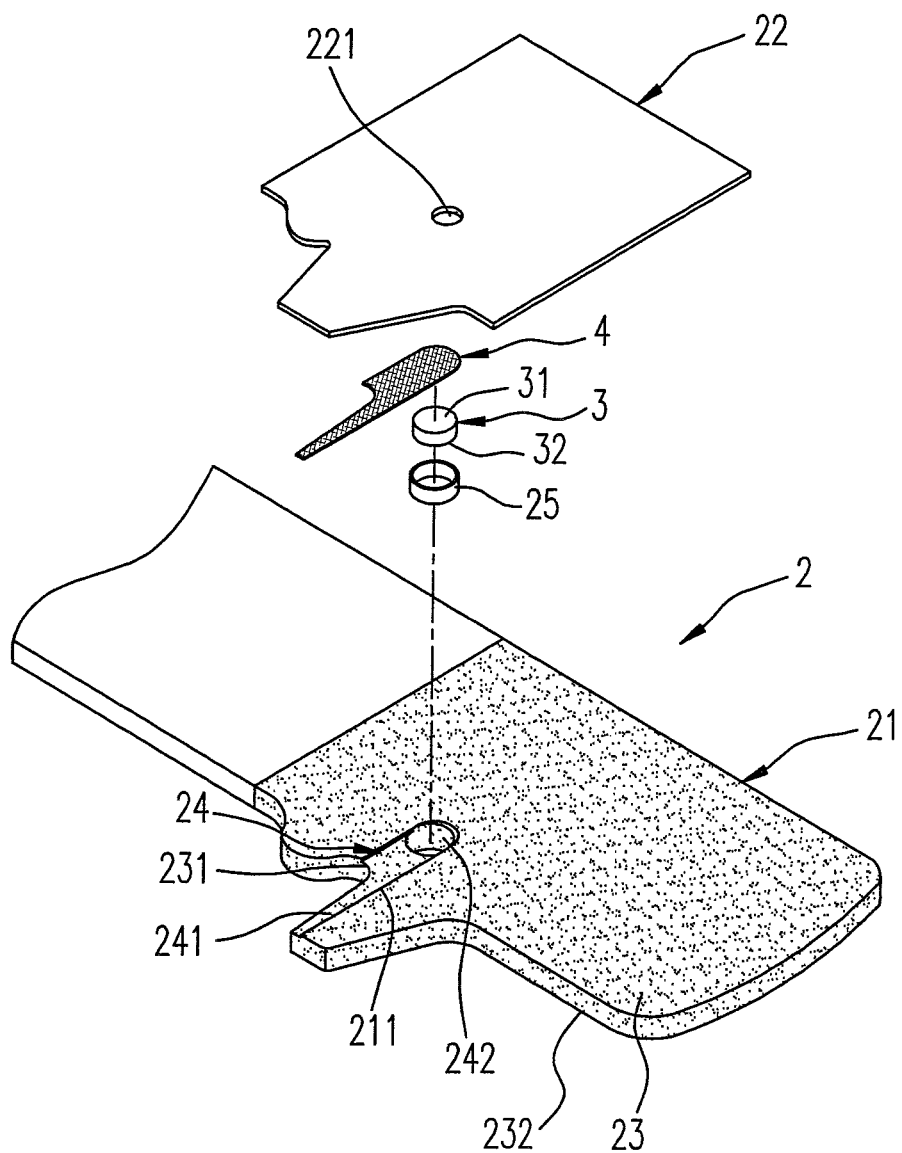
FIG. 4 is a partial pictorial breakdown drawing of a first preferred embodiment of the electrochemical sensor strip of the invention.
Figure 5:
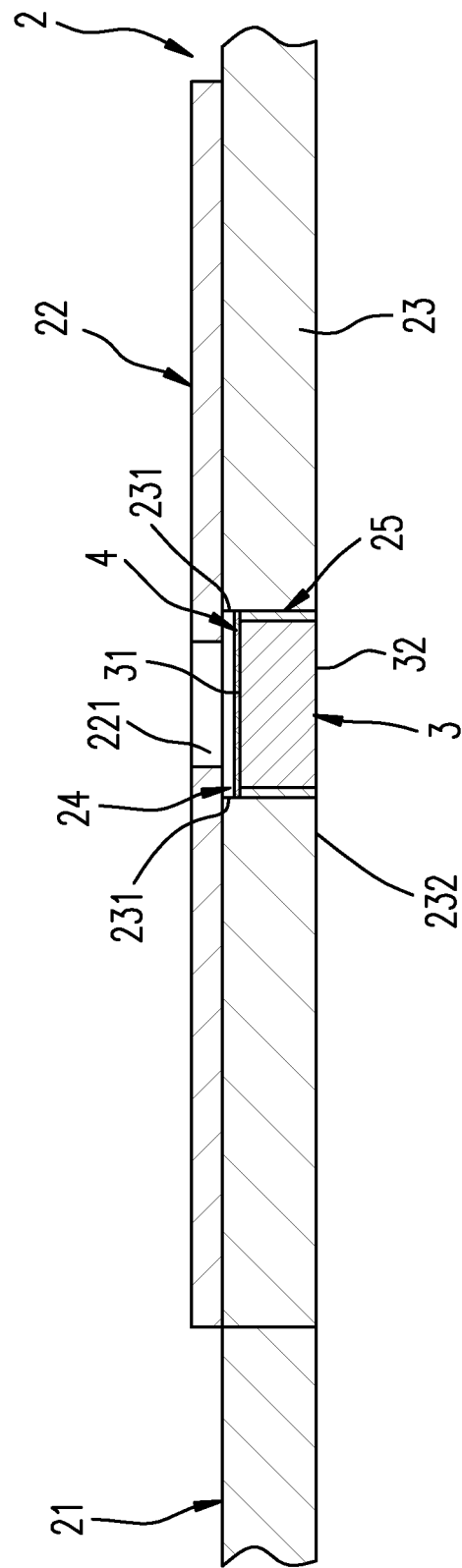
FIG. 5 is a partial sectional drawing of the first preferred embodiment.

Please refer to FIG. 4 and FIG. 5, a first preferred embodiment of the biosensor strip of the invention is applicable to detect an analyte in a sample fluid (not shown). The biosensor strip includes a strip body 2, a working electrode and a chemical reagent layer 4.

The strip body includes a substrate 21, a cover plate 22 assembled on the substrate 21, a conductive portion 23 integrally formed on at least any one of the substrate 21 and the cover plate 22, a reaction channel 24 defined by the relationship between the substrate 21 and the cover plate 22 and an insulator 25, wherein the partial wall forming the reaction channel 24 is a partial or an entire surface layer corresponding to the conductive portion 23, and the substrate 21 has a recess 211 corresponding to the cover plate 22. The substrate 21 is assembled with the cover plate 22. The reaction channel 24 is formed by the wall between the wall of the cover plate 22 and the wall of the recess 211 of the substrate 21 corresponding thereto. In the embodiment, the partial wall of the reaction channel means the annulus wall of the recess 211 and the wall corresponding to the cover plate. The conductive portion 23 has an electro-reaction side 231 on the surface and a first signal output side 232 opposite to the electro-reaction side 231. The reaction channel 24 has an opening 241 which can receive the sample fluid, and an electrode hole 242 in the concave portion of the recess 211. In the embodiment, the first signal output side 232 is an outside wall of the substrate 21 opposite to the recess 211. Further, it is not necessary that the first signal output side 232 extends to the outside wall so long as it is different from the electro-reaction side 231 and therefore receives the electro-signal.

The working electrode 3 is made of one selected from a group consisting of gold, platinum, rhodium, palladium, ruthenium, iridium, silver, copper, nickel, titanium, chromium, iron, aluminum and a combination thereof. The working electrode 3 electrically insulated from the substrate 21 is embedded in the electrode hole 242 by the insulator 25. The working electrode 3 has an electrode action side 31 corresponding to the reaction channel 24 and a second signal output side 32 opposite to the electrode action side 31.

The chemical reagent layer 4 covers at least the working electrode 3 in the reaction channel 24 and is located to the electro-reaction side 231 of the conductive portion 23 and electrode action side 31 of the working electrode 3. The chemical reagent layer 4 is applicable for generating an electrochemical reaction with the analyte and outputs the detected current signal through the first and second signal output sides 232 and 32.

In the embodiment, the conductive portion 23, is formed in a partial area of the substrate 21, forms a partial wall of the reactive channel 24 which is a partial portion of the conductive portion 23, and is electrically insulated from the partial wall of the electrode hole 242 used to dispose the working electrode 3, wherein the insulator 25 is housed by the working electrode 3 and therefore these two are electrically insulated in the embodiment.

In the embodiment, the cover plate 22 has an vent 221 connected to the reaction channel 24.

In the embodiment, the conductive portion 23 is integrally formed in the substrate 21. The conductive portion 23 can be selected from a low cost conductive material such as a carbon containing material (such as a carbon based screen printing electrode or a graphite bar), a conductive polymer material or another non-noble metal material (for example, a silver, a copper, a copper alloy copper, a brass, an oxygen-free copper, a bronze, a phosphorized copper, a nickel silver copper and a beryllium copper).

In the embodiment, the edge of the opening 241 adjacent to the reaction channel 24 is uneven, which is configured to avoid the circumstance that the opening 241 will be completely sealed during the injection of the sample material such that the sample material cannot flow into the reaction channel 24.

During use, the sample fluid enters the reaction channel 24 via the opening 241 and the vent 221 is used to adjust the pressure in the reaction channel 24 to facilitate the successful filling of the sample fluid the bottom area of the reaction channel 24. When the sample fluid contacts the chemical reagent layer 4, there is an electrochemical reaction generated between the analyte and the chemical reagent layer 4. The electro-reaction side 231 and the electrode action side 31 of the electrode 3 detect the electrical signal generated from the electrochemical reaction and output the electrical signal via the first signal output side 232 and the second signal output side 32.

Through the combination above, the effect and advantage of the biosensor strip of the invention can be summarized as follows.

1. The conductive portion 23 integrally formed on the substrate 21 or the cover plate 22 becomes the wall in the reactive channel, and therefore it only requires one electrode as the working electrode 3 and the electro-reaction side 231 of the conductive portion 23 to detect the electrical signal. In comparison with the prior art structure requiring two electrodes configured at the same time, it is reduced to one electrode in the invention. Therefore, there is an effect of reducing the usage of the noble metal and cost.

2. The necessary configured amount of the electrode is reduced in the design of the conductive portion of the invention. Because only one electrode is required as shown in the invention and thereby the volume inside the reaction recess can be reduced substantially. The reaction channel of the invention has a volume of 0.3 mm$^3$ and the amount of the sample fluid is not greater than 0.3 µL. Therefore, the volume of the required sample fluid is reduced compared to the prior art.

3. It can directly contact the signal connecting area of the measuring instrument (not shown) to perform the electrical coupling by the first signal output side 231 of the conductive portion 23 and the second signal output side 32 of the working electrode 3 which are directly formed on the substrate 21 or the cover plate 22. In comparison with the prior art where the measuring instrument is electrically coupled therewith using a printed conductive track method, the invention avoids the conductive track design and directly and integrally forms the conductive portion 23, which has advantages such as substantially simplifying the manufacturing process, raising the yield rate and reducing the production cost.

Figure 6:
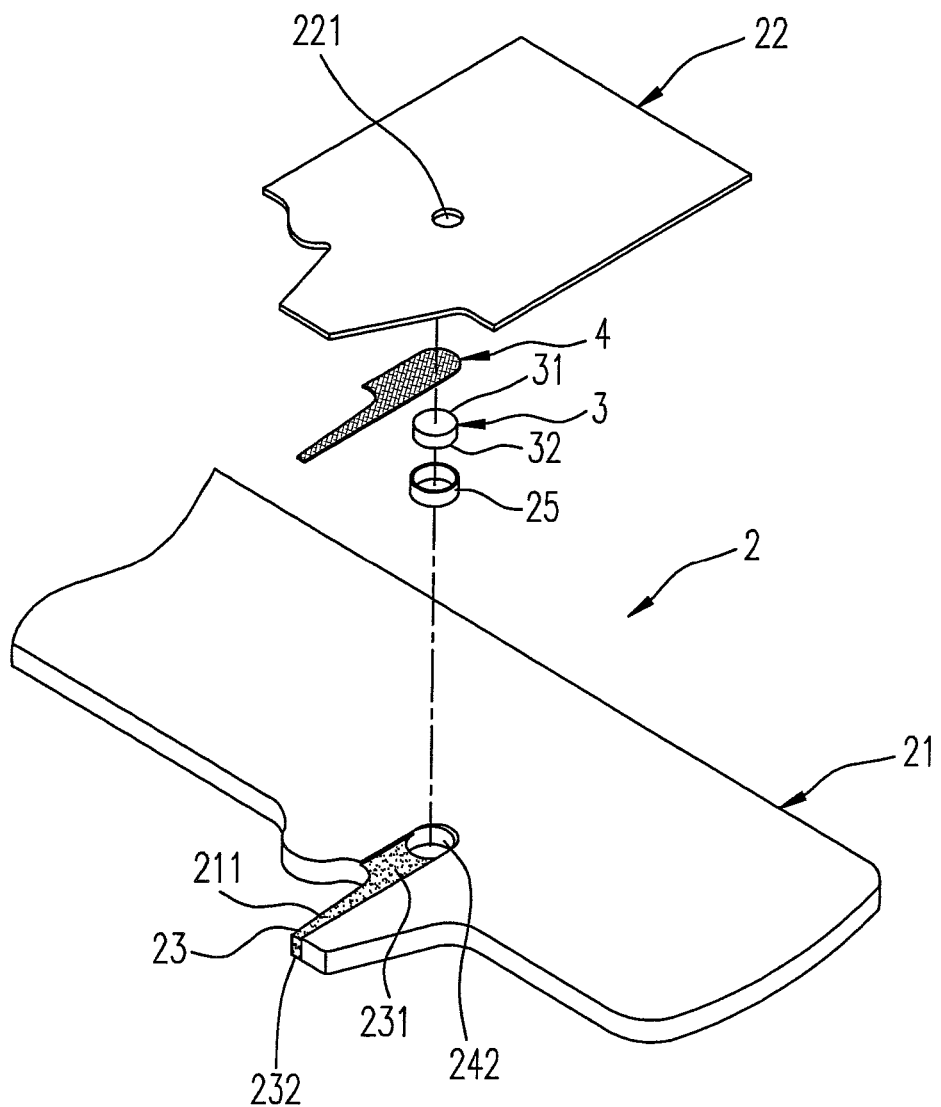
FIG. 6 is a partial pictorial breakdown drawing of a second preferred embodiment of the electrochemical sensor strip of the invention.

Please refer to FIG. 6. The second preferred embodiment of the biosensor strip of the invention is approximately the same as the first preferred embodiment. The difference is that the conductive portion 23 is only formed on the wall of the recess 211 of the substrate 21 and extends outward from the wall of the recess 221 to the position of the first signal output side 232, wherein the rest of the portions of the substrate 21 and cover plate 22 are formed as insulated areas. Therefore, the objective and effect of the second preferred embodiment can be achieved in the same way as those of the first preferred embodiment.

Figure 7:
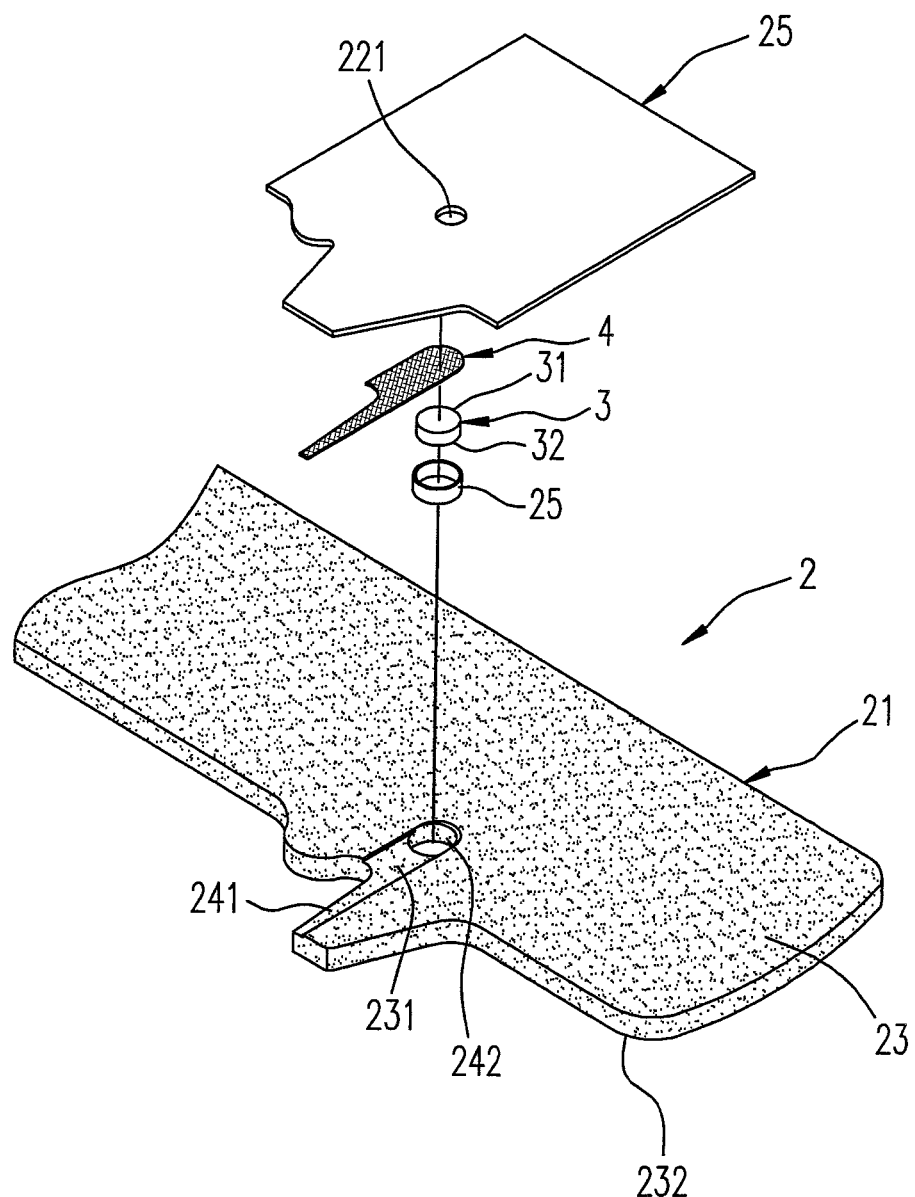
FIG. 7 a partial pictorial breakdown drawing of a third preferred embodiment of the electrochemical sensor strip of the invention.

Please refer to FIG. 7. The third preferred embodiment of the biosensor strip of the invention is approximately the same as the first preferred embodiment. The difference is that the substrate is integrally formed as the conductive portion 23. Therefore, the objective and effect of the third preferred embodiment can be achieved in the same way as those of the first preferred embodiment.

Figure 8:
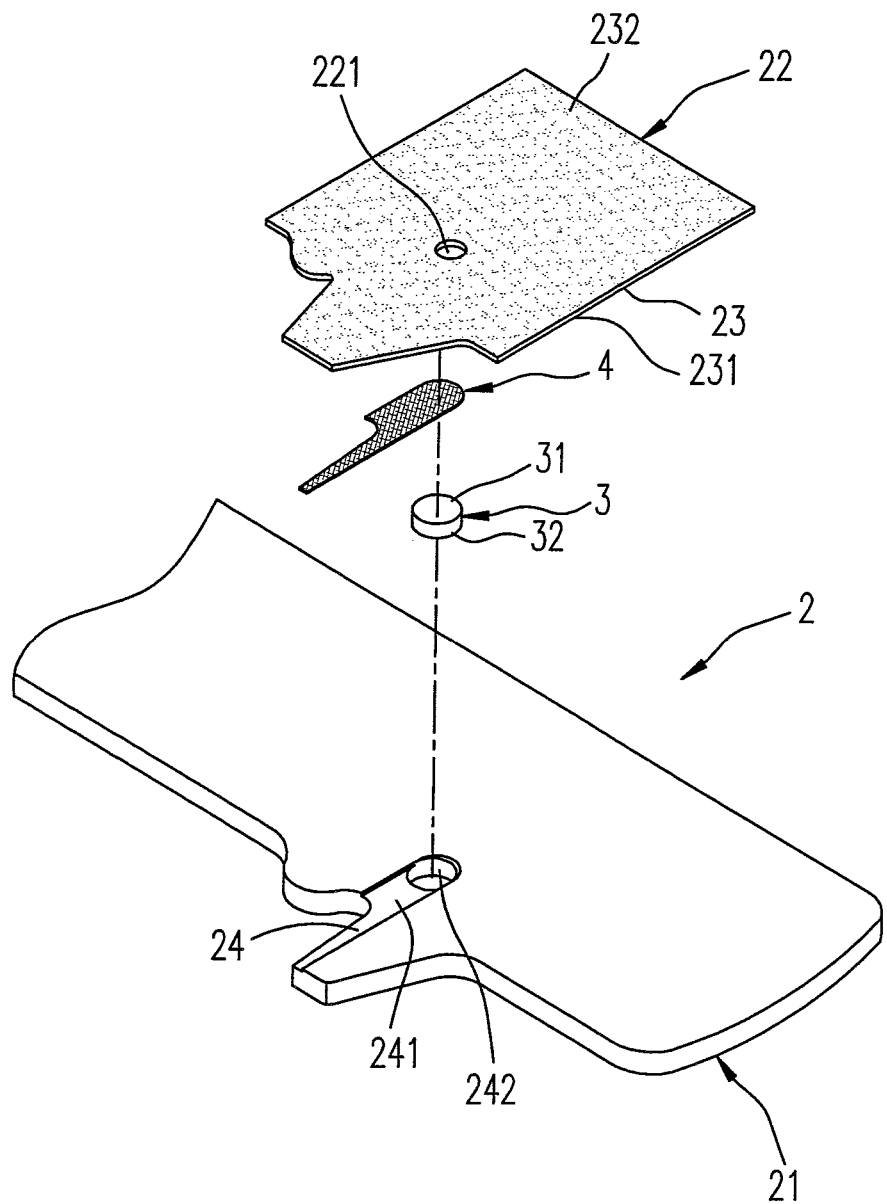
FIG. 8 is a partial pictorial breakdown drawing of a fourth preferred embodiment of the electrochemical sensor strip of the invention.

Please refer to FIG. 8. The fourth preferred embodiment of the biosensor strip of the invention is approximately the same as the first preferred embodiment. The difference is that the conductive portion 23 is formed on the cover plate 22 corresponding to the wall of the reaction channel 24 and extends from the corresponding wall to the area of the first signal output side 232. Therefore, the objective and effect of the fourth preferred embodiment can be achieved in the same way as those of the first preferred embodiment.

In summary, the electro-reaction side 231 is formed by the conductive portion 23 integrally formed on the substrate 21 or the cover plate 22 in the invention. Therefore, the electro-reaction side 231 and the electrode action side 31 of the working electrode 3 can match and perform the detection of the electrical signal with only one working electrode. In comparison with two noble metal embedded electrodes strip design and the general conductive track strip design which required the use of the traditional printing process, in this invention, the usage of fabricating noble metals can be reduced, the printing process is not required and the required bottom area of the reaction channel 24 can be reduced, and therefore the effect of reducing the cost and the amount of the sample fluid can be achieved at the same time. Thus, the objectives of the invention are achieved.

Embodiments

1. A biosensor strip for detecting an analyte in a sample fluid, comprises: a strip body including a substrate, a cover plate assembled on the substrate, a conductive portion having a surface layer and being integrally formed on at least one of the substrate and the cover plate, and a reaction channel defined by the substrate and the cover plate, wherein a partial wall forming the reaction channel is one of a partial portion and an entire portion of the surface layer of the conductive portion corresponding to the reaction channel, the conductive portion has an electric response surface, and a first signal output surface different from the electric response surface, and the reaction channel has an opening receiving the sample fluid, and an electrode hole; a working electrode embedded in the electrode hole, having an electrode acting surface corresponding to the reaction channel, and a second signal output surface different from the electrode acting surface; and a chemical reagent layer covering at least the working electrode in the reaction channel, and generating an electrochemical reaction with the analyte, wherein after the sample fluid covers the reaction channel and the working electrode via the opening, the conductive portion and the working electrode configured on the partial wall generate sensing currents respectively and output signals via the first and second signal output surfaces to determine an analyte concentration in the sample fluid.

2. The biosensor strip according to Embodiment 1, wherein the conductive portion is formed on the substrate, and the partial wall is one of a partial portion and an entire portion of the conductive portion, which is electrically insulated from the partial wall surrounding the electrode hole, and used to dispose the working electrode.

3. The biosensor strip according to Embodiments 1-2, wherein the partial wall defines the reaction channel, is one of a partial portion and an entire portion of the conductive portion, which is located at the position of the cover plate and electrically insulated from the relative position of the electrode hole after the working electrode is disposed.

4. The biosensor strip according to Embodiments 1-3, wherein the cover plate of the strip body includes a vent communicating with the reaction channel.

5. The biosensor strip according to Embodiments 1-4, wherein the conductive portion is made of one selected from a group consisting of a carbonaceous material, a conductive polymer material and a non-precious metal, and integrally formed on at least one of the substrate and the cover plate 6. The biosensor strip according to Embodiments 1-5, wherein the strip body further includes an insulator disposed in the electrode hole, and the working electrode is disposed in the insulator and embedded in the electrode hole to separate the conductive portion and the working electrode.

7 The biosensor strip according to Embodiments 1-6, wherein the cover plate includes a wall, the substrate includes a notch surrounded by the partial wall, the substrate is assembled with the cover plate, and the reaction channel is formed between the wall of the cover plate and the partial wall.

8. A biosensor strip for detecting an analyte in a sample fluid, comprises: a conductive strip body including a hole and a reaction channel; a hollow insulating piece received in the hole; a working electrode disposed in the hollow insulating piece; a chemical reagent layer disposed on the working electrode, and generating an electrochemical reaction with the analyte through a cooperation of the working electrode and the conductive strip body when the sample fluid is filled in the reaction channel; and a cover plate covering the hole and the reaction channel.

9. The biosensor strip according to Embodiment 8, wherein the conductive strip body further includes a substrate and the cover plate is assembled on the substrate 10. The biosensor strip according to Embodiments 8-9, wherein the conductive strip body further includes a conductive portion having a surface layer and being integrally formed on at least one of the substrate and the cover plate, and the reaction channel is defined by the substrate and the cover plate, wherein a partial wall forming the reaction channel is one of a partial portion and an entire portion of the surface layer of the conductive portion corresponding to the reaction channel, the conductive portion has an electronic response surface, and a first signal output surface different from the electronic response surface, and the reaction channel has an opening receiving the sample fluid, and an electrode hole.

11. The biosensor strip according to Embodiments 8-10, wherein the working electrode has an electrode acting surface corresponding to the reaction channel, and a second signal output surface different from the electrode acting surface.

12. The biosensor strip according to Embodiments 8-11, wherein the conductive portion and the working electrode configured on the partial wall generate sensing currents respectively and output signals via the first and second signal output surfaces to determine analyte concentration in the sample fluid.

13. The biosensor strip according to Embodiments 8-12, wherein the cover plate of the conductive strip body includes a vent fluidly communicating with the reaction channel.

14. A biosensor strip for detecting an analyte in a sample fluid, comprises: a strip body including a hole and a reaction channel; a hollow insulating piece received in the hole; a working electrode disposed in the hollow insulating piece; a conductive cover plate covering the hole and the reaction channel; and a chemical reagent layer disposed on the working electrode, and generating an electrochemical reaction with the analyte through a cooperation of the working electrode and the conductive cover plate when the sample fluid is filled in the reaction channel.

15. The biosensor strip according to Embodiment 14, wherein the strip body further includes a substrate and the conductive cover plate is assembled on the substrate 16. The biosensor strip according to Embodiments 14-15, wherein the conductive cover plate further includes a conductive portion having a surface layer and being integrally formed on at least one of the substrate and the conductive cover plate, and the reaction channel is defined by the substrate and the conductive cover plate, wherein a partial wall forming the reaction channel is one of a partial portion and an entire portion of the surface layer of the conductive portion corresponding to the reaction channel, the conductive portion has an electronic response surface, and a first signal output surface different from the electronic response surface, and the reaction channel has an opening receiving the sample fluid, and an electrode hole.

17. The biosensor strip according to Embodiments 14-16, wherein the working electrode has an electrode acting surface corresponding to the reaction channel, and a second signal output surface different from the electrode acting surface.

18. The biosensor strip according to Embodiments 14-17, wherein the conductive portion and the working electrode configured on the partial wall generate sensing currents respectively and output signals via the first and second signal output surfaces to interpret biological information.

19. The biosensor strip according to Embodiments 14-18, wherein the conductive cover plate cover plate of the strip body includes a vent communicating with the reaction channel.

20. The biosensor strip according to Embodiments 14-19, wherein the conductive portion is made of one selected from a group consisting of a carbonaceous material, a conductive polymer material and a non-precious metal, and integrally formed on at least one of the substrate and the conductive cover plate However, the descriptions above are only preferred embodiments of the invention which do not limit the scope of the invention, i.e. the simple alterations and modifications according to the claims and content of the specification of the invention still fall under the scope included by the invention.

What is claimed is:

1. A biosensor strip for detecting an analyte in a sample fluid, consisting of:

a strip body including a substrate, an exterior, a cover plate configured on the exterior and assembled on the substrate, a conductive portion having a surface layer and being integrally formed with at least one of the substrate and the cover plate to form a conductive portion signal output, and a reaction channel defined by the substrate and the cover plate, wherein a partial wall forming the reaction channel is one of a partial portion and an entire portion of the surface layer of the conductive portion corresponding to the reaction channel, the conductive portion has an electric response surface, and a first signal output surface different from the electric response surface, and the reaction channel has an opening receiving the sample fluid, and a single electrode hole;

a single electrode provided for forming a conductive loop with the conductive portion through the sample fluid to detect current signals, being a rod having a top surface and a bottom surface parallel to the top surface and embedded in the electrode hole, having an electrode action surface being the top surface corresponding to the reaction channel and parallel to the surface layer, and a second signal output surface being the bottom surface opposite to the electrode action surface, wherein the electrode extends from the electrode action surface to the second signal output surface in a direction perpendicular to the surface layer; and a chemical reagent layer covering at least the electrode in the reaction channel, and configured to generate an electrochemical reaction with the analyte, wherein after the sample fluid covers the reaction channel and the electrode via the opening, the conductive portion configured on the partial wall and the electrode generate sensing currents respectively and output the current signals in the direction via the first and second signal output surfaces to determine an analyte concentration in the sample fluid.

2. The biosensor strip according to claim 1, wherein the conductive portion is formed on the substrate, and the partial wall is one of a partial portion and an entire portion of the conductive portion, which is electrically insulated from the partial wall surrounding the electrode hole, and used to dispose the electrode.

3. The biosensor strip according to claim 1, wherein the partial wall defines the reaction channel, is one of a partial portion and an entire portion of the conductive portion, which is located at the position of the cover plate and electrically insulated from the relative position of the electrode hole after the electrode is disposed.

4. The biosensor strip according to claim 1, wherein the cover plate of the strip body includes a vent communicating with the reaction channel.

5. The biosensor strip according to claim 1, wherein the conductive portion is made of one selected from a group consisting of a carbonaceous material, a conductive polymer material and a non-noble metal, and integrally formed with at least one of the substrate and the cover plate.

6. The biosensor strip according to claim 1, wherein the strip body further includes an insulator disposed in the electrode hole, and the electrode is disposed in the insulator and embedded in the electrode hole to separate the conductive portion and the electrode.

7. The biosensor strip according to claim 1, wherein the cover plate includes a wall, the substrate includes a notch surrounded by the partial wall, the substrate is assembled with the cover plate, and the reaction channel is formed between the wall of the cover plate and the partial wall.

8. A biosensor strip for detecting an analyte in a sample fluid, consisting of:

a conductive strip body including a conductive portion integrally formed therewith, a hole, a substrate, an exterior and a reaction channel;

a hollow insulating piece received in the hole;

a single electrode provided for forming a conductive loop with the conductive portion through the sample fluid to detect current signals, being a rod having a top surface and a bottom surface parallel to the top surface and disposed in the hollow insulating piece, herein the electrode has an electrode action surface being the top surface corresponding to the reaction channel and parallel to a surface of the conductive strip body, and an electrode signal output surface being the bottom surface opposite to the electrode action surface, and extends from the electrode action surface to the electrode signal output surface in a direction perpendicular to the surface of the conductive strip body;

a chemical reagent layer disposed on the electrode, and configured to generate an electrochemical reaction with the analyte through a cooperation of the electrode and the conductive strip body when the sample fluid is filled in the reaction channel, wherein the electrochemical reaction causes the current signals to flow in the direction to the electrode signal output surface; and a cover plate disposed on the exterior and covering the hole and the reaction channel, wherein the cover plate is configured as a conductive portion signal output.

9. The biosensor strip according to claim 8, wherein the conductive strip body further includes a substrate and the cover plate is assembled on the substrate.

10. The biosensor strip according to claim 9, wherein the conductive portion has a surface layer and is integrally formed with at least one of the substrate and the cover plate, and the reaction channel is defined by the substrate and the cover plate, wherein a partial wall forming the reaction channel is one of a partial portion and an entire portion of the surface layer of the conductive portion corresponding to the reaction channel, the conductive portion has an electric response surface, and a conductive portion signal output surface different from the electric response surface, and the reaction channel has an opening receiving the sample fluid, and an electrode hole.

11. The biosensor strip according to claim 10, wherein the conductive portion and the electrode configured on the partial wall generate sensing currents respectively and output current signals via the conductive portion and electrode signal output surfaces to interpret biological information.

12. The biosensor strip according to claim 8, wherein the cover plate of the conductive strip body includes a vent communicating with the reaction channel.

13. A biosensor strip for detecting an analyte in a sample fluid, consisting of:

a strip body including a conductive portion forming a whole piece with the rest of the strip body, a hole and a reaction channel;

a hollow insulating piece received in the hole;

a single electrode provided for forming a conductive loop with the conductive portion through the sample fluid to detect current signals and disposed in the hollow insulating piece;

a conductive cover plate covering the hole and the reaction channel; and a chemical reagent layer disposed on the electrode, and configured to generate an electrochemical reaction with the analyte through a cooperation of the electrode and the conductive cover plate when the sample fluid is filled in the reaction channel, wherein the conductive portion and the electrode output the current signals, and the biosensor strip includes no other electrode.

14. The biosensor strip according to claim 13, wherein the strip body further includes a substrate and the conductive cover plate is assembled on the substrate.

15. The biosensor strip according to claim 14, wherein the conductive portion has a surface layer, and the reaction channel is defined by the substrate and the conductive cover plate, wherein a partial wall forming the reaction channel is one of a partial portion and an entire portion of the surface layer of the conductive portion corresponding to the reaction channel, the conductive portion has an electric response surface, and a conductive portion signal output surface different from the electric response surface, and the reaction channel has an opening receiving the sample fluid, and an electrode hole.

16. The biosensor strip according to claim 15, wherein the electrode has an electrode acting surface corresponding to the reaction channel, and an electrode signal output surface different from the electrode acting surface, the conductive portion and the electrode configured on the partial wall generate sensing currents respectively and output the current signals via the conductive portion and the electrode signal output surfaces to interpret biological information.

17. The biosensor strip according to claim 13, wherein the conductive cover plate includes an air hole fluidly communicating with the reaction channel.

18. The biosensor strip according to claim 15, wherein the conductive portion is made of one selected from a group consisting of a carbonaceous material, a conductive polymer material and a non-precious metal, and integrally formed with at least one of the substrate and the conductive cover plate.

19. A biosensor strip for detecting an analyte in a sample fluid, consisting of:
a strip body including a conductive portion integrally formed therewith, an exterior, a reaction channel and a substrate having a single through hole;
a hollow insulating piece received in the through hole;
a single electrode provided for forming a conductive loop with the conductive portion through the sample fluid to detect current signals, being a rod and disposed in the hollow insulating piece, wherein the electrode has a bottom surface and an electrode action surface corresponding to the reaction channel and parallel to a surface of the strip body, and an electrode signal output extends from the electrode action surface to the bottom surface in a direction perpendicular to the surface of the strip body;
a cover plate disposed on the exterior and covering the through hole and the reaction channel; and
a chemical reagent layer disposed on the electrode, and configured to generate an electrochemical reaction with the analyte through a cooperation of the electrode and the conductive portion when the sample fluid is filled in the reaction channel, wherein:
the electrochemical reaction causes the current signals to flow in the direction to the electrode signal output surface to interpret biological information;
the conductive portion is integrally formed with at least one of the substrate and the cover plate to be a conductive portion signal output; and
the reaction channel has a volume not larger than 0.3 $mm^3$.

\* \* \* \* \*